US008054789B2

(12) United States Patent
Boariu et al.

(10) Patent No.: US 8,054,789 B2
(45) Date of Patent: Nov. 8, 2011

(54) AGGREGATED HARQ REPORT

(75) Inventors: Adrian Boariu, Irving, TX (US); Shashikant Maheshwari, Irving, TX (US); Yousuf Saifullah, Richardson, TX (US)

(73) Assignee: Nokia Siemens Networks Oy, Espoo (FI)

( * ) Notice: Subject to any disclaimer, the term of this patent is extended or adjusted under 35 U.S.C. 154(b) by 831 days.

(21) Appl. No.: 12/149,502

(22) Filed: May 2, 2008

(65) Prior Publication Data

US 2008/0279145 A1 Nov. 13, 2008

Related U.S. Application Data

(60) Provisional application No. 60/924,223, filed on May 4, 2007.

(51) Int. Cl.
*H04L 1/00* (2006.01)
(52) U.S. Cl. ........................................ 370/329; 370/242
(58) Field of Classification Search ................. 370/216, 370/235, 236, 242, 244, 252, 312, 315, 328, 370/329, 390, 392.4, 432, 468
See application file for complete search history.

(56) References Cited

U.S. PATENT DOCUMENTS

| 2003/0086427 | A1 | 5/2003 | Lee et al. | |
|---|---|---|---|---|
| 2003/0147348 | A1* | 8/2003 | Jiang | 370/229 |
| 2007/0073805 | A1* | 3/2007 | Jorgensen | 709/203 |
| 2007/0086422 | A1* | 4/2007 | Kim et al. | 370/349 |
| 2008/0022178 | A1* | 1/2008 | Kim et al. | 714/748 |
| 2008/0081651 | A1* | 4/2008 | Kuroda et al. | 455/509 |
| 2008/0101312 | A1* | 5/2008 | Suzuki et al. | 370/342 |

FOREIGN PATENT DOCUMENTS

| EP | 1 780 926 A1 | 5/2007 |
|---|---|---|
| EP | 1 858 190 A1 | 11/2007 |
| WO | WO 97/24829 | 7/1997 |

OTHER PUBLICATIONS

Komatsu, Masaharu, "Simple Go-Back-N- ARQ Scheme for Satellite Channels with Double Acknowledgements", Electronics and Communications in Japan, Part 1, vol. 74, No. 5, May 1, 1991, pp. 55-61.
International Search Report PCT/IB2008/002477 filed May 2, 2008.

\* cited by examiner

*Primary Examiner* — Brian Nguyen
(74) *Attorney, Agent, or Firm* — Squire, Sanders & Dempsey, LLP

(57) ABSTRACT

A system and method include a base station configured to provide centralized data transmission scheduling for at least one relay operatively connected to the base station configured to provide centralized data transmission scheduling for at least one relay operatively connected to the base station in a point-to-point connection and configured to provide centralized data transmission scheduling for at least one mobile station operatively connected to the relay in a point-to-multipoint connection. The method efficiently reports ACKs/NAKs for a centralized scheduler wireless system that uses tunneling for data transmission and, in order to reduce a usage of bandwidth for reporting. The system and method also perform an aggregation via coding of ACK/NAK channels.

37 Claims, 7 Drawing Sheets

AGGREGATED HARQ REPORT

CROSS REFERENCE TO RELATED APPLICATION

This application claims priority under 35 U.S.C. §119(e) of U.S. Provisional Patent Application Ser. No. 60/924,223, filed May 4, 2007. The subject matter of the earlier filed application is hereby incorporated by reference.

BACKGROUND OF THE INVENTION

1. Field of the Invention

The present invention relates to an apparatus, a system, and a method to efficiently report ACKs/NAKs for a centralized scheduler wireless system that uses tunneling for data transmission and, in order to reduce a usage of bandwidth for reporting, the apparatus, the system, and the method perform an aggregation via coding of ACK/NAK channels.

2. Description of the Related Art

A worldwide interoperability for microwave access (WiMAX) system lends itself as a lightweight Internet access technology. It is built on top of 802.16 standard family MAC+PHY (Medium Access Control+Physical layer) standard from IEEE (certified by WiMAX). The system standard (higher layers and network) is standardized and certified by WiMAX Forum.

802.16 Mobile Multi-Hop Relay (MMR), a study item established in the IEEE 802.16 working group, provides examples of relay networking. The MMR working group focuses on defining a network system that utilizes relays stations (RS) to extend the network coverage and/or enhance the system throughput. A relay network may include, in part, relay stations (RS0 and RS1), mobile stations or subscriber stations (MS0, MS1, and MS2), and a base station (BS).

Hybrid automatic repeat request (H-ARQ) is a scheme which combines ARQ protocols with forward-error-correcting (FEC) schemes that are generally considered to be the best error-control techniques for wireless links. Different wireless technology may have different H-ARQ schemes.

In IEEE 802.16, the H-ARQ scheme is implemented as a part of the media access controller (MAC) and can be enabled on a per-terminal basis. Two main variants of H-ARQ are supported: chase combining and incremental redundancy (IR). For Internet protocol detailed recorder (IR), the PHY layer encodes the H-ARQ generating four versions for the encoded H-ARQ attempts. Each H-ARQ attempt is uniquely identified using a H-ARQ attempt identifier (SPID). For chase combining, the PHY layer encodes the H-ARQ packet generating only one version of the encoded packet. As a result, no SPID is required for chase combining.

For downlink operation, the BS sends a version of the encoded H-ARQ packet to the MS. The MS attempts to decode the encoded packet on this first H-ARQ attempt. If the decoding is successful, the MS sends an acknowledgement (ACK) to the BS. If the decoding is not successful, the MS sends a non-acknowledgement (NAK) to the BS. In response, the BS will send another H-ARQ attempt to the MS. The BS may continue to send H-ARQ attempts until the MS successfully decodes the packet and sends an ACK.

The H-ARQ scheme works well in a system without a relay station (RS) where the H-ARQ scheme is applied directly between the BS and MS. However, when a RS is introduced into the system, although H-ARQ is still implemented between the MS and BS, the RS needs to forward all the H-ARQ attempts and ACK/NAKs between the MS and BS.

Therefore, according to conventional solutions, if the first H-ARQ attempt is not sent successfully due to error or loss, another H-ARQ attempt needs to be sent until a mobile station (MS) or base station (BS) successfully decodes it. Consequently, the subsequent H-ARQ attempt(s) must be transmitted over all the different hops (links) between the BS and the MS. Bandwidth is re-allocated between BS and MS for transmitting the subsequent H-ARQ attempt(s), even though some of the links may have already transferred the frame successfully. This results in bandwidth wastage and throughput loss. Thus, there is a need for an enhanced H-ARQ scheme with an improved utilization of network resources.

In view of the above, an apparatus, a system, and a method are needed that would provide an efficient mode to report ACKs/NAKs for a centralized scheduler wireless system that uses tunneling for data transmission.

SUMMARY OF THE INVENTION

In accordance with an embodiment of the present invention, there is provided an apparatus, including a transmitter configured to transmit data through relays to network elements, wherein downlink and uplink transmission resources are allocated from the apparatus to the relays and the network elements, and a point-to-point detector configured to detect a failure in a point-to-point data transmission from the apparatus to a relay. The apparatus also includes a scheduler configured to reschedule data transmission and reallocate the downlink and uplink transmission resources according to the point-to-point data transmission that failed, a point-to-multipoint detector configured to detect a failure in a point-to-multipoint data transmission between the relay and a network element, and a controller configured to determine a particular link that failed between the relay and the network element. The scheduler is further configured to reschedule data transmission and reallocate the downlink and uplink transmission resources according to the point-to-multipoint transmission for the particular link that failed.

In accordance with an embodiment of the present invention, there is also provided an apparatus, including a transmitter configured to transmit data through relays to network elements, wherein downlink and uplink transmission resources are allocated from the apparatus to the relays and the network elements, a scheduler configured to reschedule data transmission, and a point-to-multipoint detector configured to detect a failure in a point-to-multipoint data transmission between a relay and a network element. The apparatus also includes a controller configured to determine a particular link that failed between the relay and the network element, wherein the scheduler is further configured to reschedule data transmission and reallocate the downlink and uplink transmission resources according to the point-to-multipoint transmission for the particular link that failed.

In accordance with an embodiment of the present invention, there is also provided a system, including a processor configured to aggregate two or more point-to-multipoint connections between a relay and a plurality of network elements, and a transmitter configured to transmit data through the two or more point-to-multipoint connections to the plurality of network elements. The system also includes a point-to-multipoint detector configured to detect a transmission failure in an aggregated point-to-multipoint connection and configured to identify the aggregated point-to-multipoint connection that failed, and a scheduler configured to reschedule data transmission through the aggregated point-to-multipoint connection that failed, wherein the downlink and uplink transmission resources are reallocated according to the point-tomultipoint transmission for the aggregated point-to-multipoint connection that failed.

In accordance with an embodiment of the present invention, there is also provided an apparatus, including transmitting means for transmitting data through relays to network elements, wherein downlink and uplink transmission resources are allocated from the apparatus to the relays and the network elements, point-to-point detecting means for detecting a failure in a point-to-point data transmission from the apparatus to a relay, and scheduling means for rescheduling data transmission and reallocate the downlink and uplink transmission resources according to the point-to-point data transmission that failed. The apparatus includes point-to-multipoint detecting means for detecting a failure in a point-to-multipoint data transmission between the relay and a network element, and controlling means for determining a particular link that failed between the relay and the network element. The scheduling means reschedules data transmission and reallocate the downlink and uplink transmission resources according to the point-to-multipoint transmission for the particular link that failed.

In accordance with an embodiment of the present invention, there is also provided an apparatus, including transmitting means for transmitting data through relays to network elements, wherein downlink and uplink transmission resources are allocated from the apparatus to the relays and the network elements, and scheduling means for rescheduling data transmission, point-to-multipoint detecting means for detecting a failure in a point-to-multipoint data transmission between a relay and a network element. The apparatus includes controlling means for determining a particular link that failed between the relay and the network element, wherein the scheduler is further configured to reschedule data transmission and reallocate the downlink and uplink transmission resources according to the point-to-multipoint transmission for the particular link that failed.

In accordance with an embodiment of the present invention, there is also provided a method, including allocating downlink and uplink transmission resources from a base station to relays and network elements, transmitting data through the relays to the network elements, detecting a failure in a point-to-point data transmission from the base station to a relay, and rescheduling data transmission and reallocating the downlink and uplink transmission resources according to the point-to-point data transmission that failed. The method includes detecting a failure in a point-to-multipoint data transmission between the relay and a network element, determining a particular link that failed between the relay and the network element, and rescheduling data transmission and reallocate the downlink and uplink transmission resources according to the point-to-multipoint transmission for the particular link that failed.

In accordance with an embodiment of the present invention, there is also provided a method, including allocating downlink and uplink transmission resources from a base station to relays and network elements, transmitting data through the relays to the network elements, and detecting a failure in a point-to-multipoint data transmission between a relay and a network element. The method includes determining a particular link that failed between the relay and the network element, and rescheduling data transmission and reallocating the downlink and uplink transmission resources according to the point-to-multipoint transmission for the particular link that failed.

In accordance with an embodiment of the present invention, there is also provided a method, including aggregating via coding two or more acknowledgement/non-acknowledgement (ACK/NAK) channels of the point-to-multipoint connections between a relay and a plurality of network elements, transmitting the aggregated channels of two or more point-to-multipoint connections to a base station, detecting a transmission failure in an aggregated point-to-multipoint connection, and identifying the aggregated point-to-multipoint connection that failed. The method includes rescheduling data transmission through the aggregated point-to-multipoint connection that failed, and reallocating the downlink and uplink transmission resources according to the point-to-multipoint transmission for the aggregated point-to-multipoint connection that failed.

In accordance with an embodiment of the present invention, there is further provided a computer program embodied on a computer readable medium, the computer program being configured to control a processor to perform the method steps described above.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to preferred embodiments of the present invention, examples of which are illustrated in the accompanying drawings.

A wireless relay network is a multi-hop system in which end nodes, such as mobile stations (MS) and subscription stations (SS) are connected to the base station (BS) or access point (AP) via a relay station (RS). The traffic between the MS and the BS/AP passes through and is processed by the relay station (RS).

Figure 1:
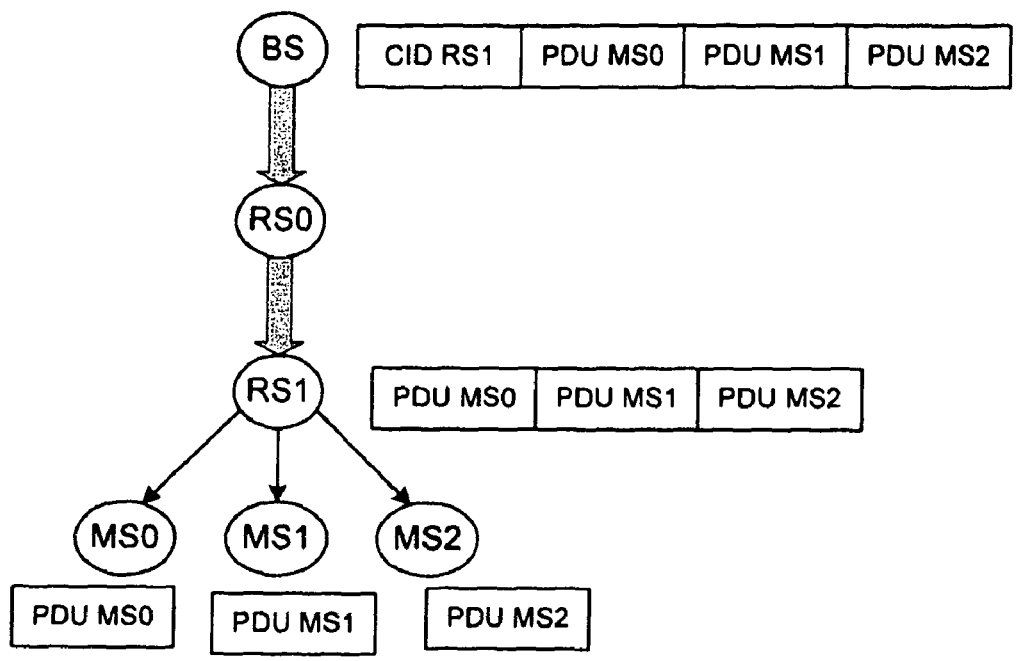
FIG. 1 illustrates an example considering a tunneling transmission for a multi-hop wireless system, in accordance with an embodiment of the present invention.

In a wireless topology that includes RSs it is possible to use tunneling for the purpose of transmitting the data. As illustrated in FIG. 1, the tunneled data may be bundled and transmitted to a destination RS which may be distributed further to each entity (the MS or the RS) that is part of the bundle. In other words, with tunneling, multiple media access control protocol data units (MPDUs) may be placed together with one tunnel header, but on an access link each individual MPDUs may have to be separated and transmitted. Hybrid automatic repeat request (H-ARQ) may treat this aggregated tunnel packet as one HARQ packet, while on an access link there may be multiple HARQ for each constituent MPDU. This may create an issue of how the individual MPDUs ACKs/NAKs may be correlated or associated with the tunnel MPDU ACK/NAK, and how these ACKs/NAKs may have to be reported to the BS that provides the scheduling mechanism.

Therefore, in accordance with an embodiment of the present invention, an apparatus, a system, and a method are provided in which communications are established between different wireless network elements including a mobile station (MS), a centralized scheduler at a base station (BS), and relays (RSs) to efficiently report ACKs/NAKs for a centralized scheduler wireless system that uses tunneling for data transmission. In a centralized scheduler wireless system, the base station (BS) provides the scheduling for all the relays (RSs) that may be operatively connected to it.

FIG. 1 illustrates an example of tunnelling data for multiple MSs from a BS, in accordance with an embodiment of the present invention. The tunnel (marked with block arrows) may be set between a BS and RS1 for transmitting and receiving data between both elements. The tunnel may include the packet data units or frames, for instance, media access control protocol data units (MAC PDUs), for each of the MSs that are operatively connected to RS1, namely MS0, MS1 and MS2. This tunnelled packet is transmitted by the BS with a certain identifier, for instance, a connection ID (CID) of the RS1. After the tunnelled packet is received by the RS1, protocol data units in the data packet are read and each constituent protocol data unit is transmitted to the corresponding MS.

As illustrated in FIG. 1, a data tunnel from BS to RS1 (referred hereinafter as a point-to-point (PTP) connection) has the tunnel header given by the CID of RS1, but from RS1 there are several connections to each of the MSs (referred hereinafter as point-to-multipoint (PMP) connection).

From the tunnelling connection perspective, although the data is transmitted to multiple MSs, each destination (MSs) has to send ACK/NAK of its PDU back to the BS. In accordance with an embodiment of the present invention, the apparatus, the system, and the method described herein are configured to provide relevant information to the BS indicating where the radio link failed in an efficient manner via ACK/NAK channels.

Generally, a distributed scheduler allows the RSs to schedule their transmissions on its subordinate operatively connected entities as deemed appropriate. For example, the BS transmits the tunnelled data to RS0. After the RS0 receives the data, the RS0 can schedule the transmission for the next hop, for instance, to the RS1. In an instance, the RS0 may schedule by itself the transmission on the next hop, independently of the scheduled transmissions of BS and RS1.

On the other hand, for a centralized scheduler, the RS0 and RS1 are simply obeying the commands that are sent by the BS. In this case, any transmission failure has to be reported back to the BS, and the report should include the particular hop that failed. For illustrative purposes, the embodiments of the present invention are described with respect to a centralized scheduler at a base station. However, a person of ordinary skill in the art will appreciate that a distributed scheduler may be implemented as well.

Figure 2:
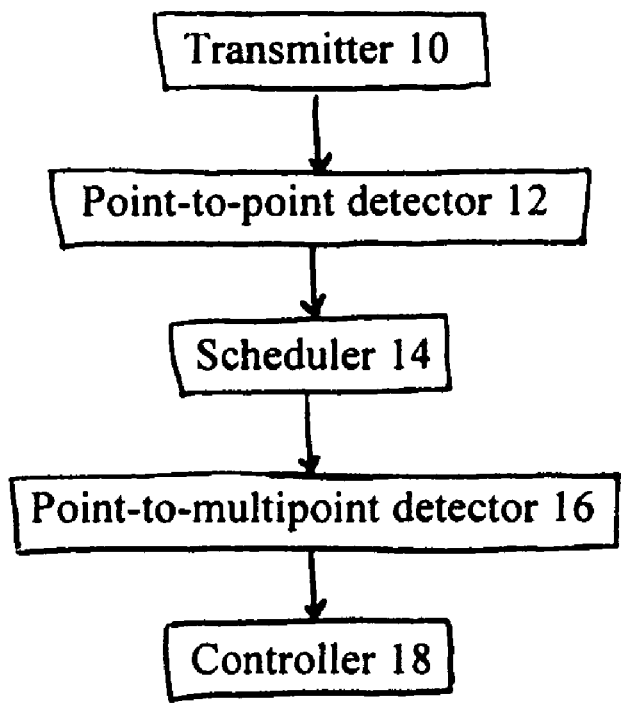
FIG. 2 illustrates a configuration of the centralized scheduler at the BS for tunneling data, in accordance with an embodiment of the present invention.

FIG. 2 illustrates a configuration of the centralized scheduler at the BS for tunneling data, in accordance with an embodiment of the present invention. The centralized scheduler includes a transmitter 10 configured to transmit data through relays to mobile stations (MSs). Downlink and uplink transmission resources are allocated from the BS to the relays and the MSs. The BS also includes a point-to-point detector 12 configured to detect a failure in a point-to-point data transmission from the BS to a relay. A scheduler 14 is configured to reschedule data transmission to the relay. A point-to-multipoint detector 16 in the BS is configured to detect a failure in a point-to-multipoint data transmission between the BS and a MS. A controller 18 is configured to determine a particular access link that failed between the BS and the MS. The scheduler 14 is further configured to reschedule data transmission and reallocate the downlink and uplink transmission resources according to the point-to-multipoint transmission for the particular access link that failed.

Figure 3:
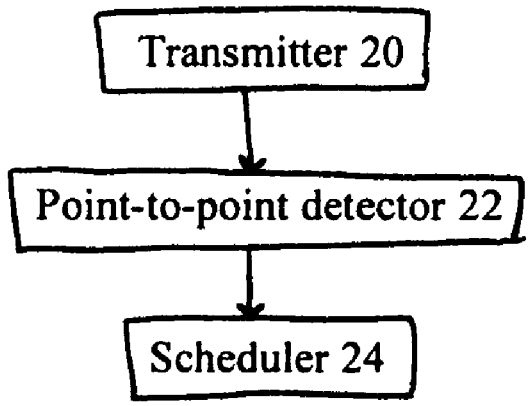
FIG. 3 illustrates another configuration of the centralized scheduler at the BS for tunneling data, in accordance with an embodiment of the present invention.

FIG. 3 illustrates another configuration of the centralized scheduler at the BS for tunneling data, in accordance with an embodiment of the present invention. The centralized scheduler includes a transmitter 20 configured to transmit data to a plurality of relays, wherein downlink and uplink transmission resources are allocated from the BS to the plurality of relays, a point-to-point detector 22 configured to detect a point-to-point transmission that failed between the BS and a relay of the plurality of relays, and a scheduler 24 configured to reschedule data transmission to the relay. The downlink and uplink transmission resources are reallocated from where the point-to-point transmission failed.

Figure 4:
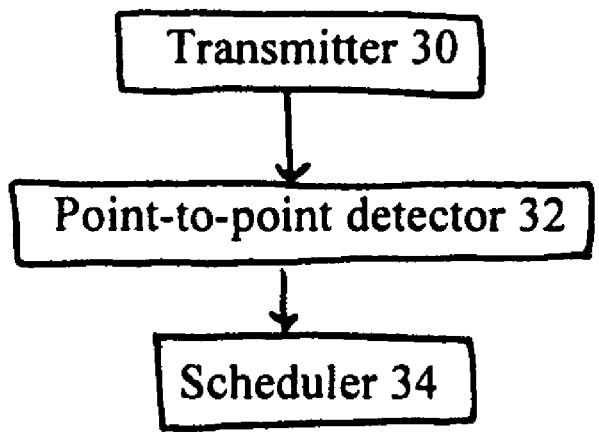
FIG. 4 illustrates a configuration of the centralized scheduler at the BS for tunneling data for multiple MSs, in accordance with an embodiment of the present invention.

FIG. 4 illustrates a configuration of the centralized scheduler at the BS for tunneling data for multiple MSs, in accordance with an embodiment of the present invention. The centralized scheduler includes a transmitter 30 configured to transmit data to a plurality of MSs. Downlink and uplink transmission resources are allocated from the BS to the plurality of MSs. The BS includes a point-to-point detector 32 configured to detect a point-to-multipoint transmission that failed between the BS and a MS of the plurality of MSs, and a scheduler 34 configured to reschedule data transmission to the MS, wherein the downlink and uplink transmission resources are reallocated from where the point-to-multipoint transmission failed.

Figure 5:
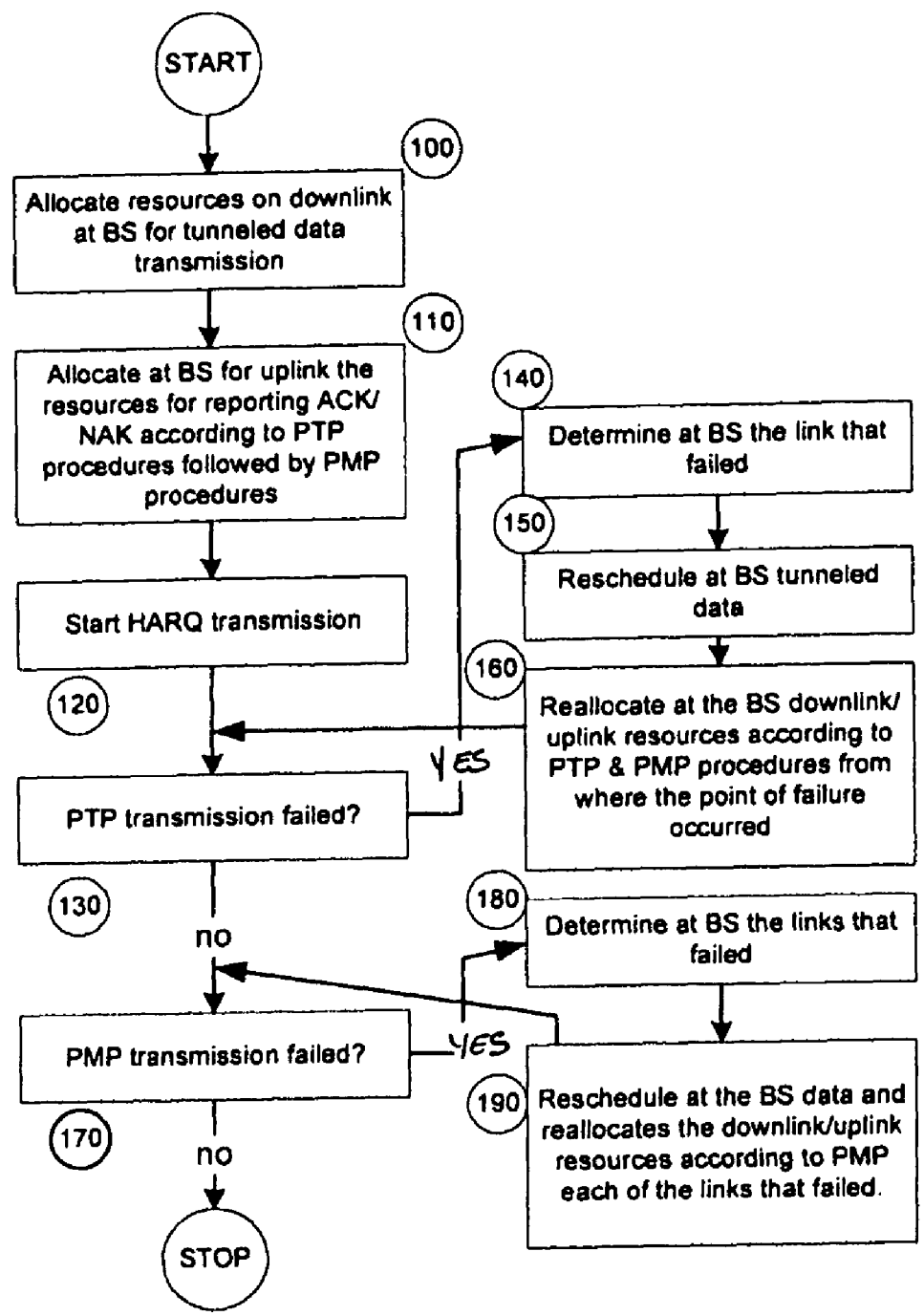
FIG. 5 illustrates a general diagram of an ACK/NAK procedure for transmission of tunneled data, in accordance with an embodiment of the present invention.

FIG. 5 illustrates a general diagram of an ACK/NAK procedure or method for transmission of tunneled data, in accordance with an embodiment of the present invention. In accordance with an embodiment of the present invention, a centralized scheduler is configured at the base station (BS) to perform the method described in FIG. 5. At step 100, the BS allocates resources for a downlink transmission of tunneled data. In one example, as shown in FIG. 1, for the downlink transmission, the resources may be allocated between the BS, RS0, and RS1. A person of ordinary skill in the art will appreciate that the resources for the downlink transmission of the tunneled data may be configured between the BS and multiple RS0s and/or multiple RS1s.

In step 110, the BS allocates channel resources for reporting the ACK/NAK in an uplink transmission. The channel resources may be allocated for each hop, taking into account assignment procedures for PTP transmission and followed by assignment procedures for PMP transmission. For instance, as shown in FIG. 1, the channel resources may be allocated based on the PTP connection between BS, RS0, and RS1. Also, shown in FIG. 1, the resources may be allocated based on the PMP connections between RS1 and MS0, MS1, and MS2, for instance.

At step 120, the HARQ transmission is started. Between step 120 and step 170, the actual HARQ transmissions/retransmissions procedure is illustrated. The HARQ transmission or mechanism is used by the BS to automatically repeat transmissions of data that are not acknowledged by the MS. The series of transmissions of a frame of data include the HARQ process. Thus, in the HARQ process, after the resources on downlink at the MS have been allocated for the tunneled data transmission and data is transmitted from the BS to the MS using the ACK/NAK channel of the uplink, the MS receives the data, decodes the data and then transmits an acknowledgment (ACK) to the BS. If, on the other hand, the MS receives, but does not successfully decode the data, the MS will transmit a non-acknowledgment (NAK) to the BS. When the BS receives the non-acknowledgment, it knows that the data was not successfully received and decoded. The BS would therefore re-transmit this data (i.e., the HARQ process is continued.) The same is true if neither an acknowledgment nor a non-acknowledgment is received by the BS.

Accordingly, during the HARQ process, at step 130, the BS determines whether the PTP transmission failed. If it is determined that the PTP transmission of the tunneled data failed, the procedure executed by the BS continues to step 140. At step 140, the BS determines the particular PTP connection that failed (that is, between the BS and RS0 or between the RS0 and RS1), for instance, based on a NAK report from the RS1 to the BS, for instance. At step 150, the BS may then reschedule the tunneled data. At step 160, the BS may allocate corresponding resources for transmission from where the point of failure occurred along the transmission path. In this instance, the resources may include both, PTP and PMP data transmission. The procedure then goes back to step 130, so that the BS can determine whether the PTP transmission has been resolved or whether it is still failing. If the PTP transmission is still failing, the procedure would repeat steps 140-160 until the PTP transmission is resolved.

If at step 130, the procedure determined that the PTP transmission did not fail or it has been determined that the PTP transmission has been resolved, the procedure continues to step 170. At step 170, the BS determines whether the PMP transmission failed along the path. If there is a failed transmission for the PMP transmission, at step 180, the BS determines a particular access link(s) that failed (for instance, BS to MS0, MS1, or MS2). At step 190, the BS reschedules data transmission and reallocates the downlink/uplink resources according to the PMP transmission for each of the links that failed. The procedure then goes back to step 170, so that the BS can determine whether the PMP transmission has been resolved or whether it is still failing. If the PMP transmission is still failing, the procedure would repeat steps 180-190 until the PMP transmission is resolved. Thus, in steps 180-190, the individual ACKs/NAKs are simply forwarded to the BS. In other words, the BS considers that the tunnel form BS to RS1 has been successful, and deals the remaining PMP connections.

If at step 170, the procedure determined that the PMP transmission did not fail or it has been determined that the transmission has been resolved, the HARQ procedure stops.

Figure 6:
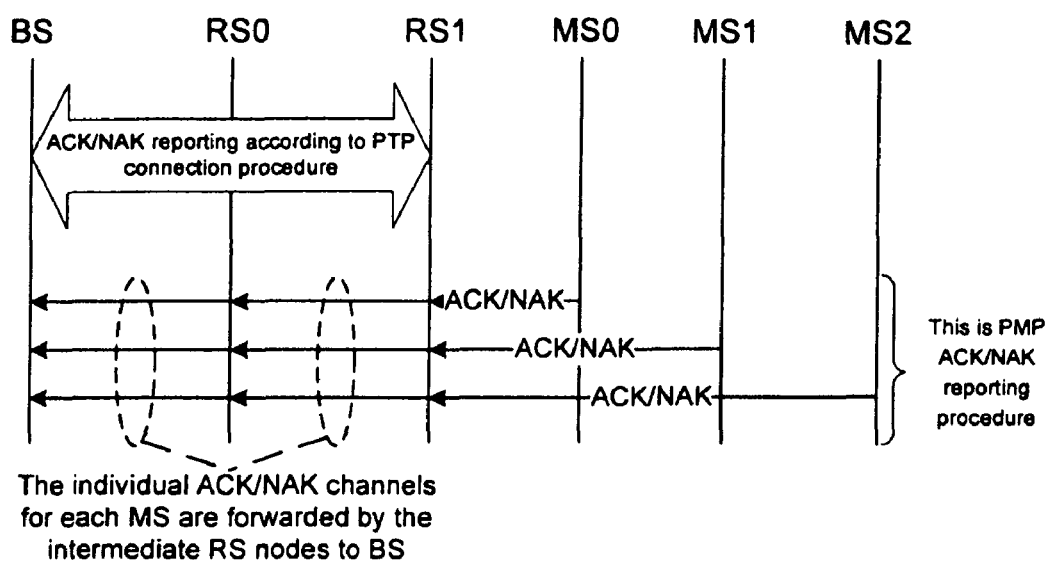
FIG. 6 illustrates an example of a PMP ACK/NAK reporting procedure in which relay nodes forward to a base station individual ACKs/NAKs of each mobile station, in accordance with a first embodiment of the present invention.

FIG. 6 illustrates an example of a PMP ACK/NAK reporting procedure or method in which the RS1 and RS0 forward to the BS individual ACKs/NAKs of each of the MSs that are at the end of a data tunnel, in accordance with a first embodiment of the present invention. The PTP ACK/NAK connection reporting procedure between the BS, RS0 and RS1, provides information indicative of whether the transmission of the tunneled data failed and the point of failure (for instance, steps 130-160 of FIG. 5 illustrate this procedure).

The individual ACKs/NAKs of the MSs, in turn, inform the BS if their data was received correct or in error over the RS1 to MS link. For example, if the data transmission failed at the RS1 (for instance, the RS1 reports NAK to the BS), the reporting of the failure to the BS is conducted via the PTP procedure. The BS would first analyze the PTP report and if the PTP report indicates a failure, in one embodiment of the present invention, the BS may completely neglect the PMP reports from the MSs. The BS would then schedule a next time for the data to be retransmitted using HARQ starting from RS0.

In another example, if the PMP report, the MS0 and the MS1 indicate no failure (ACK) of their data reception while MS2 indicates failure (NAK), then the BS may schedule for HARQ retransmission from the RS1 of only the media access control protocol data unit (MDPU) associated with the MS2.

The BS may assign the individual ACK/NAK channels related to the PMP procedure for the RS1 in a particular order for the protocol data units to be transmitted by each of the MSs. For instance, as illustrated in FIG. 6, the allocation zone for PMP reporting ACK/NAK channels may be assigned in the following order: MS0, MS1 and MS2, respectively.

Figure 7:
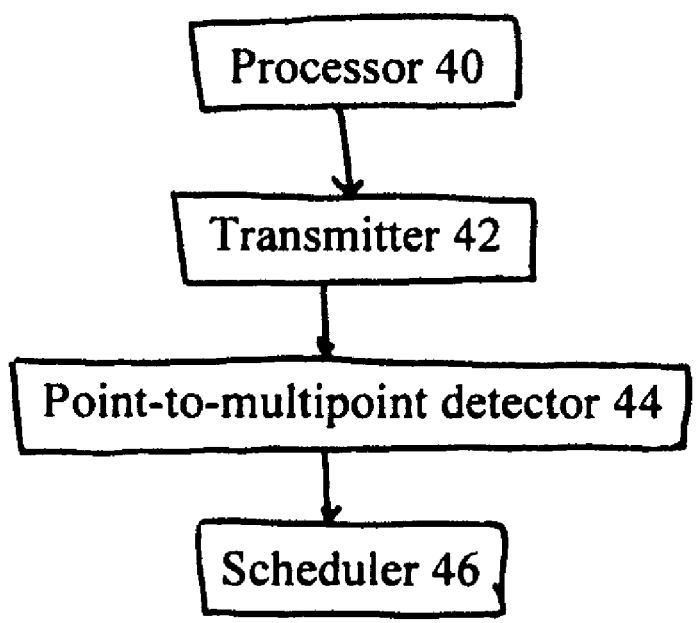
FIG. 7 illustrates a configuration for tunneling data, in accordance with an embodiment of the present invention.

FIG. 7 illustrates a configuration for tunneling data, in accordance with an embodiment of the present invention. A processor 40 at a relay (e.g., RS1) is configured to aggregate two or more point-to-point connections between the relay and a plurality of MSs. A transmitter 42 in the BS is configured to transmit data to a plurality of network elements. Downlink and uplink transmission resources may be allocated from the BS to the MSs. A point-to-multipoint detector 44 is configured to detect a point-to-multipoint transmission that failed between the BS and an MS of the MSs. A scheduler 46 is configured to reschedule data transmission to the network element. The downlink and uplink transmission resources are reallocated from where the point-to-multipoint transmission failed.

Figure 8:
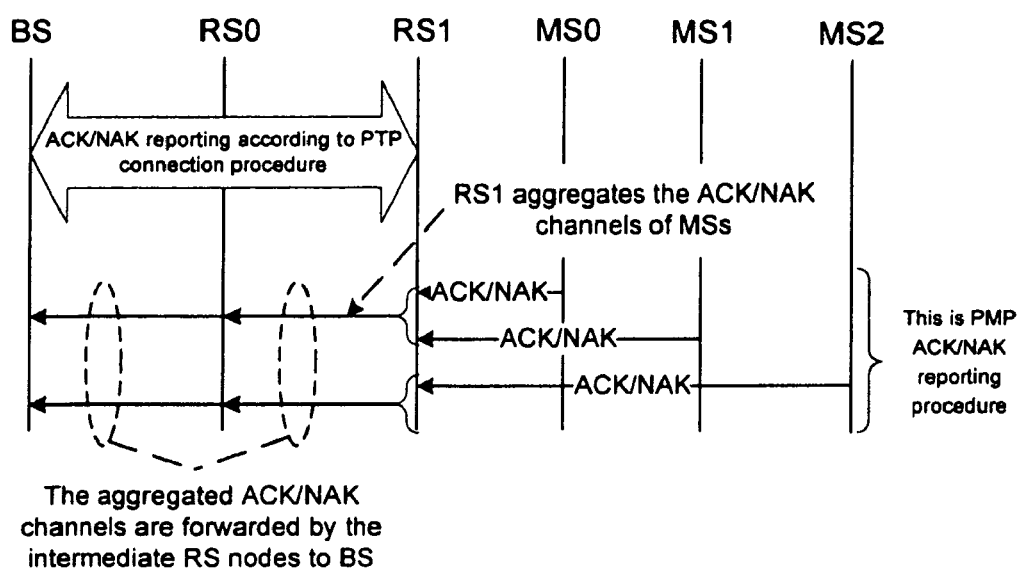
FIG. 8 illustrates an example of a PMP reporting when ACK/NAK channels of the mobile stations are aggregated at an end of a tunnel by a relay node before the ACK/NAKs are forwarded to the base station, in accordance with a second embodiment of the present invention.

FIG. 8 illustrates an example of PMP reporting when the ACK/NAK channels of MSs are aggregated at the end of a tunnel by the RS1 before the ACK/NAKs are forwarded to the BS, in accordance with a second embodiment of the present invention. FIG. 8 illustrates that two ACK/NAK channels may be aggregated, for instance. The aggregation may be done via coding (to be later described), which allows a reduction of a number of ACK/NAK channels that are being used (two ACK/NAK channels in this case relative to three individual ACK/NAK channels as shown in FIG. 6). Specifically, as illustrated in FIG. 8, the RS1 may aggregate the ACK/NAK channels from MS0 and MS1. Therefore, some of the many advantages of the second embodiment illustrated in FIG. 8 are that bandwidth and energy may be saved.

The BS would assign the aggregated ACK/NAK channels related to PMP procedure for the RS1 in the order in which the protocol data units of the MSs are received. In the considered example of FIG. 8, the aggregation may be performed for two adjacent ACK/NAK channels, for instance, first aggregation may be for MS0 and MS1, and a second aggregation may be for MS2 and a Null MS (this is neglected at the BS). In the allocation zone for PMP reporting, the aggregated ACK/NAK channels may be assigned in order.

Therefore, in order to reduce the usage of bandwidth for reporting, aggregating the ACK/NAK channels may be desirable. The aggregation via coding referred to in FIG. 8 is an aggregation of a number of n ACK/NAK channels requires a number of $N = 2^n$ codewords.

The n ACK/NAK channels can be represented as a = [a_1 a_2 ... a_n], where a value a_k=0 if the corresponding PDU has been received correctly (ACK), or a_k=1 if the corresponding PDU has been received in error (NAK).

A person of ordinary skill in the art will appreciate that the opposite may be configured, where a_k=1 if the corresponding PDU has been received correctly (ACK), or a_k=0 if the corresponding PDU has been received in error (NAK).

Also, for a combination of a, a codeword, P, may be assigned from a set of N codewords. Considering the example of aggregation of two ACK/NAK channels (MS0 and MS1) presented in FIG. 8, the following corresponding coding table, Table 1, can be derived, where n =2 ACK/NAK channels requiring N =4 codewords:

TABLE 1

| a = [a_1 a_2] | codeword |
|---|---|
| [0 0] | P_0 |
| [0 1] | P_1 |
| [1 0] | P_2 |
| [1 1] | P_3 |

As shown in Table 1, if the RS1 sends to the BS for the first aggregated channel the codeword P_2, for example, and the BS detects the code word P_2 correctly, the BS would then decode [1 0]. According with the assignment of a_k, the MS0 reports NAK (bit is 1) and MS1 reports ACK (bit is 0). If the RS1 sends for the second aggregated channel to BS the codeword P_0, for example, and the BS detects it correctly, the BS decodes [0 0]. According with the assignment of a_k this means that MS2 reports ACK (bit is 0) and the second bit 0 is neglected because it is a Null MS (that is, it does not exist; it is used as a dummy).

In accordance with an embodiment of the present invention, if a total number of ACK/NAK channels that need to be aggregated is M, and the aggregation is performed in groups of n, then a number of resulted aggregated channels that may result is ceiling(M/n). Furthermore, in accordance with an embodiment of the present invention, the system can limit the number of protocol data units that may be tunnelled. If this number is small (for instance, two to three protocol data units), other coding schemes for transmitting the ACK/NAK reports may be used.

In accordance with an alternative embodiment of the present invention, an alternative efficient transmission could be configured so that the ACK/NAK reporting from the PTP and PMP connections may share the same reporting channel. In this case, the codewords for PTP and PMP could be different in order to allow the BS to separate the overlapped transmissions.

In accordance with an alternative embodiment of the present invention, an alternative efficient transmission could be to expand the coding representation presented in Table 1 to include the ACK/NAK reporting from the PTP connections, that is, a could include the ACK/NAK reporting from the PTP connections.

Figure 9:
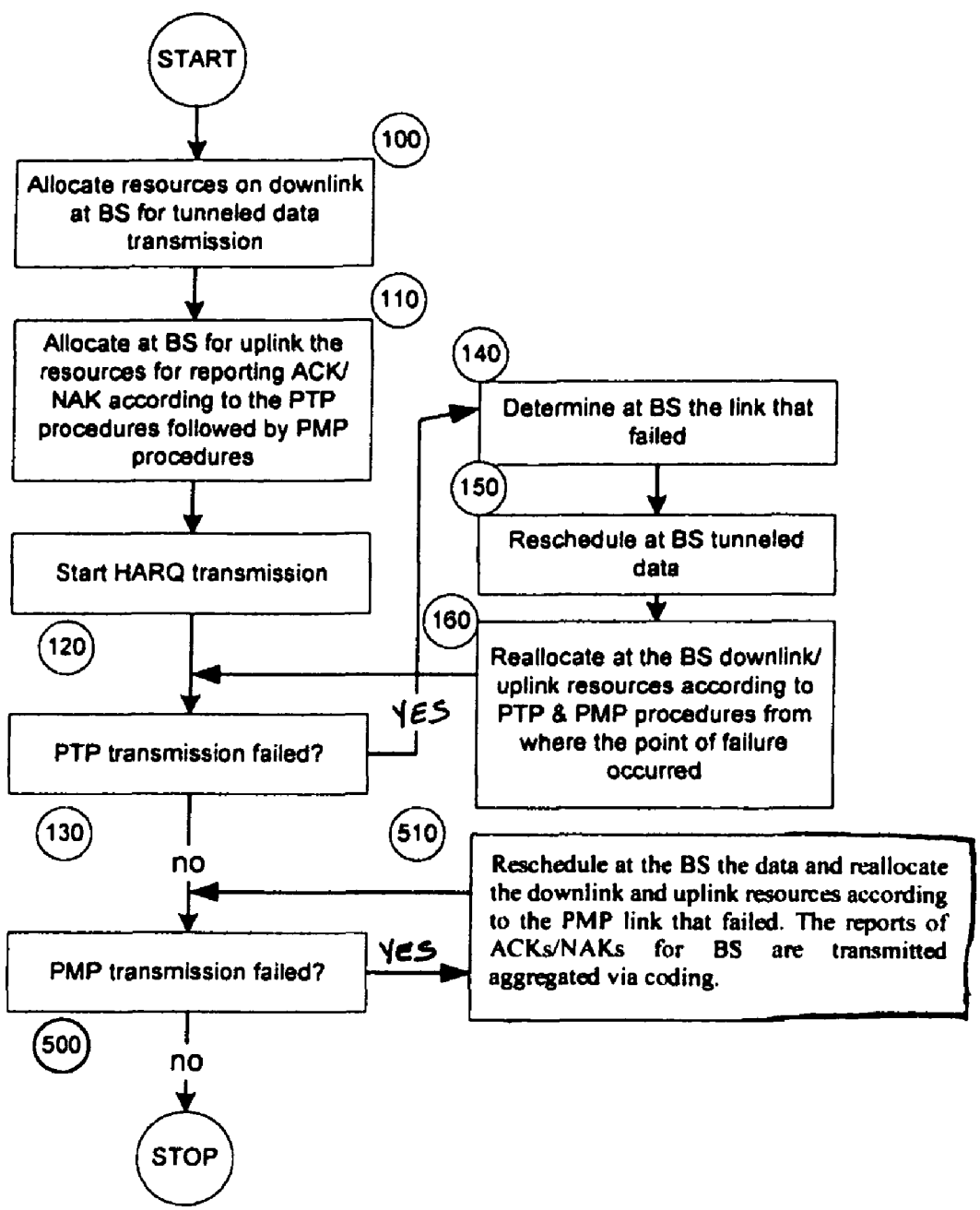
FIG. 9 illustrates a general diagram of a procedure for retransmitting the ACK/NAK channels when PTP connections are successful, in accordance with the second embodiment of the present invention.

FIG. 9 illustrates a general diagram of a procedure or method for retransmitting the ACK/NAK channels when PTP connections are successful, in accordance with the second embodiment of the present invention. In accordance with an embodiment of the present invention, steps 100 to 160 are illustrated and performed as done in FIG. 5. If at step 130, the procedure determined that the PTP transmission did not fail or it has been determined that the transmission has been resolved, the procedure continues to step 500.

At step 500, the BS determines whether the PMP transmission failed along the path. If there is a failed transmission for the PMP transmission, at step 510, the BS reschedules data transmission and reallocates the downlink/uplink resources according to the PMP transmission for each of the links that failed. The reports of ACKs/NAKs for BS are transmitted aggregated via coding. For example, if the MS1 has been reported as successful to the BS while the MS0 and MS2 still need retransmissions, then the procedure would allow RS1 to aggregate for reporting the ACKs/NAKs channel responses for MS0 and MS2 only, and this report would be forwarded to BS. If at step 520, the procedure determined that the PTP transmission did not fail or it has been determined that the transmission has been resolved, the HARQ procedure stops.

In accordance with an embodiment of the present invention, a computer program product embodied on a computer-readable medium may also be provided, encoding instructions for performing at least the method described in FIGS. 5 and 9, in accordance with an embodiment of the present invention. The computer program product can be embodied on a computer readable medium. The computer program product can include encoded instructions for processing the tunnelling transmission for a wireless multihop wireless system, which may also be stored on the computer readable medium.

The computer program product can be implemented in hardware, software, or a hybrid implementation. The computer program product can be composed of modules that are in operative communication with one another, and which are designed to pass information or instructions to a communications device such as a user equipment or network node. The computer program product can be configured to operate on a general purpose computer or an application specific integrated circuit (ASIC).

A person of ordinary skill in the art will appreciate that one of the many advantages of the present invention is to provide relevant information pertaining to where the radio link failed in an efficient manner via ACK/NAK channels to the BS.

Furthermore, although the description of the embodiments of the present invention with respect to FIGS. 1-9 have been described as the MS reporting ACK/NAK via the ACK/NAK channels, a person of ordinary skill in the art will appreciate that the same system configurations and methods may be implemented where data would be transmitted from the MS to the BS using the ACK/NAK channels of the uplink, the BS would then receive the data, decode the data and then transmit an acknowledgment (ACK) to the MS.

A person of ordinary skill in the art will appreciate that although the configurations described with respect to FIGS. 1-9 have been described where the centralized scheduler is at the BS, other network elements could be configured to include a centralized scheduler to include similar structure and perform similar operations as those described with respect to the centralized scheduler being at the BS. Furthermore, the centralized scheduler could be configured as an independent unit from any other network element.

It is to be understood that, in the embodiment of the present invention, the steps described in FIGS. 5 and 9 may be performed in the sequence and manner as shown, although the order of some steps and the like may be changed without departing from the spirit and scope of the present invention. In addition, the steps described in FIGS. 5 and 9 may be repeated as many times as needed.

With respect to the present invention, a mobile station may be any network element or device that utilizes network data, and can include user equipment, a terminal, a network element, switches, routers, a communication terminal, bridges, gateways or servers. In addition, while the term data has been used in the description of the present invention, the invention has import to many types of network data. For purposes of this invention, the term data includes packet, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and step illustrated and described, and accordingly all suitable modifications and equivalents may be resorted to, falling within the scope of the invention.

What is claimed:

1. An apparatus, comprising:
   a transmitter configured to transmit data through relays to network elements, wherein downlink and uplink transmission resources are allocated from the apparatus to the relays and the network elements;
   a point-to-point detector configured to detect a failure in a point-to-point data transmission from the apparatus to a relay;
   a scheduler configured to reschedule data transmission and reallocate the downlink and uplink transmission resources according to the point-to-point data transmission that failed;
   a point-to-multipoint detector configured to detect a failure in a point-to-multipoint data transmission between the relay and a network element; and
   a controller configured to determine a particular link that failed between the relay and the network element, wherein the scheduler is further configured to reschedule data transmission and reallocate the downlink and uplink transmission resources according to the point-to-multipoint transmission for the particular link that failed.

2. The apparatus as recited in claim 1, wherein the point-to-multipoint transmission that failed is ignored until the point-to-point transmission is resolved.

3. The apparatus as recited in claim 1, wherein resources are allocated for reporting an acknowledgement/non-acknowledgement signal in an uplink transmission from the network elements and relays to the apparatus.

4. The apparatus as recited in claim 1, wherein resources are allocated for each hop, including assignment procedures for point-to-point transmission and followed by assignment procedures for point-to-multipoint transmission.

5. The apparatus as recited in claim 4, wherein the resources are allocated based on a point-to-point connection between the apparatus and the relay.

6. The apparatus as recited in claim 4, wherein the resources are allocated based on point-to-multipoint connections between the relay and network elements.

7. The apparatus as recited in claim 4, wherein the point-to-point detector detects the failure in the point-to-point data transmission based on a non-acknowledgement signal transmitted from the relay to the apparatus.

8. The apparatus as recited in claim 4, wherein the point-to-multipoint detector detects the failure in the point-to-multipoint data transmission based on a non-acknowledgement signal transmitted from the network element to the apparatus.

9. The apparatus as recited in claim 1, further comprising:
   a receiver configured to receive an acknowledgment signal from the network element indicative of successful receiving and decoding of the data at the network element, and configured to receive a non-acknowledgment signal from the network element indicative of unsuccessful decoding of the data at the network element.

10. The apparatus as recited in claim 1, wherein an aggregation is performed via coding of acknowledgment/non-acknowledgment (ACK/NAK) channels of two or more point-to-multipoint connections to reduce a usage of bandwidth.

11. The apparatus as recited in claim 10, wherein the aggregation is performed via coding by performing an aggregation of a number of n ACK/NAK channels requiring a number of $N = 2^n$ codewords, where n ACK/NAK channels are represented as $a = [a\_1\ a\_2\ \ldots\ a\_n]$, where a value, $a\_k=0$ if the corresponding data has been received correctly (ACK), or $a\_k=1$ if the corresponding data has been received in error (NAK), and
   wherein if a total number of ACK/NAK channels that need to be aggregated is M, and the aggregation is performed in groups of n, then a number of resulted aggregated channels that result is ceiling(M/n).

12. The apparatus as recited in claim 1, wherein the point-to-multipoint data transmission comprises a transmission from one of the relays to each of the network elements.

13. An apparatus, comprising:
   a transmitter configured to transmit data through relays to network elements, wherein downlink and uplink transmission resources are allocated from the apparatus to the relays and the network elements;
   a scheduler configured to reschedule data transmission;
   a point-to-multipoint detector configured to detect a failure in a point-to-multipoint data transmission between a relay and a network element; and
   a controller configured to determine a particular link that failed between the relay and the network element, wherein the scheduler is further configured to reschedule data transmission and reallocate the downlink and uplink transmission resources according to the point-to-multipoint transmission for the particular link that failed.

14. The apparatus as recited in claim 13, wherein an aggregation is performed via coding of acknowledgment/non-acknowledgment (ACK/NAK) channels of two or more point-to-multipoint connections to reduce a usage of bandwidth.

15. The apparatus as recited in claim 14, wherein the aggregation is performed via coding by performing an aggregation of a number of n ACK/NAK channels requiring a number of $N = 2^n$ codewords, where n ACK/NAK channels are represented as $a = [a\_1\ a\_2\ \ldots\ a\_n]$, where a value, $a\_k=0$ if the corresponding data has been received correctly (ACK), or $a\_k=1$ if the corresponding data has been received in error (NAK), and
   wherein if a total number of ACK/NAK channels that need to be aggregated is M, and the aggregation is performed in groups of n, then a number of resulted aggregated channels that result is ceiling(M/n).

16. A system, comprising:
   a processor configured to aggregate two or more point-to-multipoint connections between a relay and a plurality of network elements;
   a transmitter configured to transmit data through the two or more point-to-multipoint connections to the plurality of network elements;

a point-to-multipoint detector configured to detect a transmission failure in an aggregated point-to-multipoint connection and configured to identify the aggregated point-to-multipoint connection that failed; and a scheduler configured to reschedule data transmission through the aggregated point-to-multipoint connection that failed, wherein the downlink and uplink transmission resources are reallocated according to the point-to-multipoint transmission for the aggregated point-to-multipoint connection that failed.

17. The system as recited in claim 16, wherein the processor is configured to aggregate via coding of acknowledgment/non-acknowledgment (ACK/NAK) channels of two or more point-to-multipoint connections to reduce a usage of bandwidth.

18. The system as recited in claim 17, wherein the processor is configured to aggregate via coding, which comprises an aggregation of a number of n ACK/NAK channels requiring a number of $N = 2^n$ codewords, where n ACK/NAK channels are represented as $a = [a\_1\ a\_2 \ldots a\_n]$, where a value, $a\_k=0$ if the corresponding data has been received correctly (ACK), or $a\_k=1$ if the corresponding data has been received in error (NAK), and wherein if a total number of ACK/NAK channels that need to be aggregated is M, and the aggregation is performed in groups of n, then a number of resulted aggregated channels that result is ceiling(M/n).

19. An apparatus, comprising:

transmitting means for transmitting data through relays to network elements, wherein downlink and uplink transmission resources are allocated from the apparatus to the relays and the network elements;

point-to-point detecting means for detecting a failure in a point-to-point data transmission from the apparatus to a relay;

scheduling means for rescheduling data transmission and reallocate the downlink and uplink transmission resources according to the point-to-point data transmission that failed;

point-to-multipoint detecting means for detecting a failure in a point-to-multipoint data transmission between the relay and a network element; and controlling means for determining a particular link that failed between the relay and the network element, wherein the scheduling means reschedules data transmission and reallocate the downlink and uplink transmission resources according to the point-to-multipoint transmission for the particular link that failed.

20. An apparatus, comprising:

transmitting means for transmitting data through relays to network elements, wherein downlink and uplink transmission resources are allocated from the apparatus to the relays and the network elements;

scheduling means for rescheduling data transmission;

point-to-multipoint detecting means for detecting a failure in a point-to-multipoint data transmission between a relay and a network element; and controlling means for determining a particular link that failed between the relay and the network element, wherein the scheduling means reschedules data transmission and reallocate the downlink and uplink transmission resources according to the point-to-multipoint transmission for the particular link that failed.

21. A method, comprising:

allocating downlink and uplink transmission resources from a base station to relays and network elements;

transmitting data through the relays to the network elements;

detecting a failure in a point-to-point data transmission from the base station to a relay;

rescheduling data transmission and reallocating the downlink and uplink transmission resources according to the point-to-point data transmission that failed;

detecting a failure in a point-to-multipoint data transmission between the relay and a network element;

determining a particular link that failed between the relay and the network element; and rescheduling data transmission and reallocate the downlink and uplink transmission resources according to the point-to-multipoint transmission for the particular link that failed.

22. The method as recited in claim 21, further comprising:

ignoring the point-to-multipoint transmission that failed until the point-to-point transmission is resolved.

23. The method as recited in claim 21, further comprising:

allocating resources for reporting an acknowledgement/non-acknowledgement signal in an uplink transmission from the network elements and relays to the base station.

24. The method as recited in claim 21, wherein the resources are allocated for each hop, including assignment procedures for point-to-point transmission and followed by assignment procedures for point-to-multipoint transmission.

25. The method as recited in claim 24, wherein the resources are allocated based on a point-to-point connection between the base station and the relay.

26. The method as recited in claim 24, wherein the resources are allocated based on point-to-multipoint connections between the relay and network elements.

27. The method as recited in claim 21, wherein the detecting of the failure in the point-to-point data transmission is based on a non-acknowledgement signal transmitted from the relay to the base station.

28. The method as recited in claim 21, wherein the detecting of the failure in the point-to-multipoint data transmission is based on a non-acknowledgement signal transmitted from the network element to the base station.

29. The method as recited in claim 21, further comprising:

receiving an acknowledgment signal from the network element indicative of successful receiving and decoding of the data at the network element, or receiving a non-acknowledgment signal from the network element indicative of unsuccessful decoding of the data at the network element.

30. The method as recited in claim 21, wherein the point-to-multipoint data transmission comprises a transmission from one of the relays to each of the network elements.

31. A method, comprising:

allocating downlink and uplink transmission resources from a base station to relays and network elements;

transmitting data through the relays to the network elements;

detecting a failure in a point-to-multipoint data transmission between a relay and a network element;

determining a particular link that failed between the relay and the network element; and rescheduling data transmission and reallocating the downlink and uplink transmission resources according to the point-to-multipoint transmission for the particular link that failed.

32. A method, comprising:
- aggregating via coding two or more acknowledgement/non-acknowledgement (ACK/NAK) channels of point-to-multipoint connections between a relay and a plurality of network elements;
- transmitting the aggregated channels of two or more point-to-multipoint connections to a base station;
- detecting a transmission failure in an aggregated point-to-multipoint connection;
- identifying the aggregated point-to-multipoint connection that failed;
- rescheduling data transmission through the aggregated point-to-multipoint connection that failed; and
- reallocating the downlink and uplink transmission resources according to the point-to-multipoint transmission for the aggregated point-to-multipoint connection that failed.

33. The method as recited in claim 32, wherein the aggregation via coding of acknowledgment/non-acknowledgment (ACK/NAK) channels of two or more point-to-multipoint connections is performed to reduce a usage of bandwidth.

34. The method as recited in claim 33, wherein the aggregation via coding comprises an aggregation of a number of n ACK/NAK channels requiring a number of $N = 2^n$ codewords, where n ACK/NAK channels are represented as a $=[a\_1\ a\_2\ \ldots\ a\_n]$, where a value, $a\_k=0$ if the corresponding data has been received correctly (ACK), or $a\_k=1$ if the corresponding data has been received in error (NAK), and
- wherein if a total number of ACK/NAK channels that need to be aggregated is M, and the aggregation is performed in groups of n, then a number of resulted aggregated channels that result is ceiling(M/n).

35. A computer program embodied on a non-transitory computer readable medium, the computer program being configured to control a processor to perform:
- allocating downlink and uplink transmission resources from a base station to relays and network elements;
- transmitting data through the relays to the network elements;
- detecting a failure in a point-to-point data transmission from the base station to a relay;
- rescheduling data transmission and reallocating the downlink and uplink transmission resources according to the point-to-point data transmission that failed;
- detecting a failure in a point-to-multipoint data transmission between the relay and a network element;
- determining a particular link that failed between the relay and the network element; and
- rescheduling data transmission and reallocate the downlink and uplink transmission resources according to the point-to-multipoint transmission for the particular link that failed.

36. A computer program embodied on a non-transitory computer readable medium, the computer program being configured to control a processor to perform:
- allocating downlink and uplink transmission resources from a base station to relays and network elements;
- transmitting data through the relays to the network elements;
- detecting a failure in a point-to-multipoint data transmission between a relay and a network element;
- determining a particular link that failed between the relay and the network element; and
- rescheduling data transmission and reallocating the downlink and uplink transmission resources according to the point-to-multipoint transmission for the particular link that failed.

37. A computer program embodied on a non-transitory computer readable medium, the computer program being configured to control a processor to perform:
- aggregating via coding two or more acknowledgement/non-acknowledgement (ACK/NAK) channels of point-to-multipoint connections between a relay and a plurality of network elements;
- transmitting the aggregated channels of two or more point-to-multipoint connections to a base station;
- detecting a transmission failure in an aggregated point-to-multipoint connection;
- identifying the aggregated point-to-multipoint connection that failed;
- rescheduling data transmission through the aggregated point-to-multipoint connection that failed; and
- reallocating the downlink and uplink transmission resources according to the point-to-multipoint transmission for the aggregated point-to-multipoint connection that failed.

* * * * *